United States Patent
Zhang et al.

(10) Patent No.: US 10,390,348 B2
(45) Date of Patent: *Aug. 20, 2019

(54) SYSTEM AND METHOD FOR AN AGILE WIRELESS ACCESS NETWORK

(71) Applicant: Huawei Technologies Co., Ltd., Shenzhen (CN)

(72) Inventors: Hang Zhang, Nepean (CA); Nimal Gamini Senarath, Ottawa (CA); Aaron James Callard, Ottawa (CA); Hamidreza Farmanbar, Ottawa (CA); Ngoc Dung Dao, Ottawa (CA); Alex Stephenne, Stittsville (CA); Petar Djukic, Nepean (CA); Xu Li, Nepean (CA); Kaveh Shafiee, Redmond, WA (US); Philippe Leroux, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,824

(22) Filed: May 1, 2017

(65) Prior Publication Data

US 2017/0237625 A1  Aug. 17, 2017

Related U.S. Application Data

(63) Continuation of application No. 14/069,948, filed on Nov. 1, 2013, now Pat. No. 9,642,146.

(Continued)

(51) Int. Cl.
*H04W 72/04* (2009.01)
*H04W 28/02* (2009.01)

(Continued)

(52) U.S. Cl.
CPC ..... *H04W 72/0486* (2013.01); *H04L 41/0816* (2013.01); *H04L 41/0896* (2013.01);
(Continued)

(58) Field of Classification Search
CPC .............. H04L 41/0816; H04W 24/02; H04W 28/0289; H04W 28/08; H04W 28/18; H04W 72/0486; H04W 92/04
See application file for complete search history.

(56) References Cited

U.S. PATENT DOCUMENTS

2002/0027887 A1* 3/2002 Moriya ................. H04L 45/122
370/256
2005/0176422 A1* 8/2005 Choi ................... H04W 76/021
455/426.2

(Continued)

FOREIGN PATENT DOCUMENTS

CN 101171804 A 4/2008
CN 102984708 A 3/2013

(Continued)

OTHER PUBLICATIONS

Huawei Technologies, Co., Ltd., International Search Report & Written Opinion, International Application No. PCT/CN2014/079297, dated Sep. 23, 2014, 13 pages.

*Primary Examiner* — Awet Haile
(74) *Attorney, Agent, or Firm* — Slater Matsil, LLP

(57) ABSTRACT

A method for agile wireless access network includes determining, by a network controller, capabilities and neighborhood relations of radio nodes in the radio access network. The network controller then configures a backhaul network infrastructure for the radio access network in accordance with the capabilities and the neighborhood relations of the radio nodes.

22 Claims, 8 Drawing Sheets

Related U.S. Application Data

(60) Provisional application No. 61/831,296, filed on Jun. 5, 2013.

(51) Int. Cl.

| | | |
|---|---|---|
| *H04W 28/08* | (2009.01) | |
| *H04L 12/24* | (2006.01) | |
| *H04W 24/02* | (2009.01) | |
| *H04W 28/18* | (2009.01) | |
| *H04W 92/04* | (2009.01) | |
| *H04W 84/10* | (2009.01) | |

(52) U.S. Cl.
CPC ............ *H04L 41/12* (2013.01); *H04L 41/147* (2013.01); *H04L 41/5067* (2013.01); *H04W 24/02* (2013.01); *H04W 28/0284* (2013.01); *H04W 28/08* (2013.01); *H04W 28/18* (2013.01); *H04W 84/105* (2013.01); *H04W 92/04* (2013.01); *Y04S 40/162* (2013.01); *Y04S 40/164* (2013.01)

(56) References Cited

U.S. PATENT DOCUMENTS

| | | |
|---|---|---|
| 2006/0203746 A1 | 9/2006 | Maggenti et al. |
| 2008/0002631 A1 | 1/2008 | Ramachandran |
| 2008/0194246 A1* | 8/2008 | Klein .................... H04W 8/082 455/422.1 |
| 2009/0122772 A1 | 5/2009 | Jung |
| 2009/0213730 A1 | 8/2009 | Zeng et al. |
| 2011/0317589 A1* | 12/2011 | Jolma ................. H04W 40/248 370/255 |
| 2012/0064908 A1 | 3/2012 | Fox et al. |
| 2012/0106370 A1* | 5/2012 | Radulescu ........ H04W 36/0083 370/252 |
| 2012/0184204 A1 | 7/2012 | Kazmi et al. |
| 2014/0066006 A1* | 3/2014 | Ray .................. H04W 28/0247 455/406 |

FOREIGN PATENT DOCUMENTS

| | | |
|---|---|---|
| CN | 103002467 A | 3/2013 |
| WO | 2012079629 A1 | 6/2012 |
| WO | 2012096605 A | 7/2012 |

\* cited by examiner

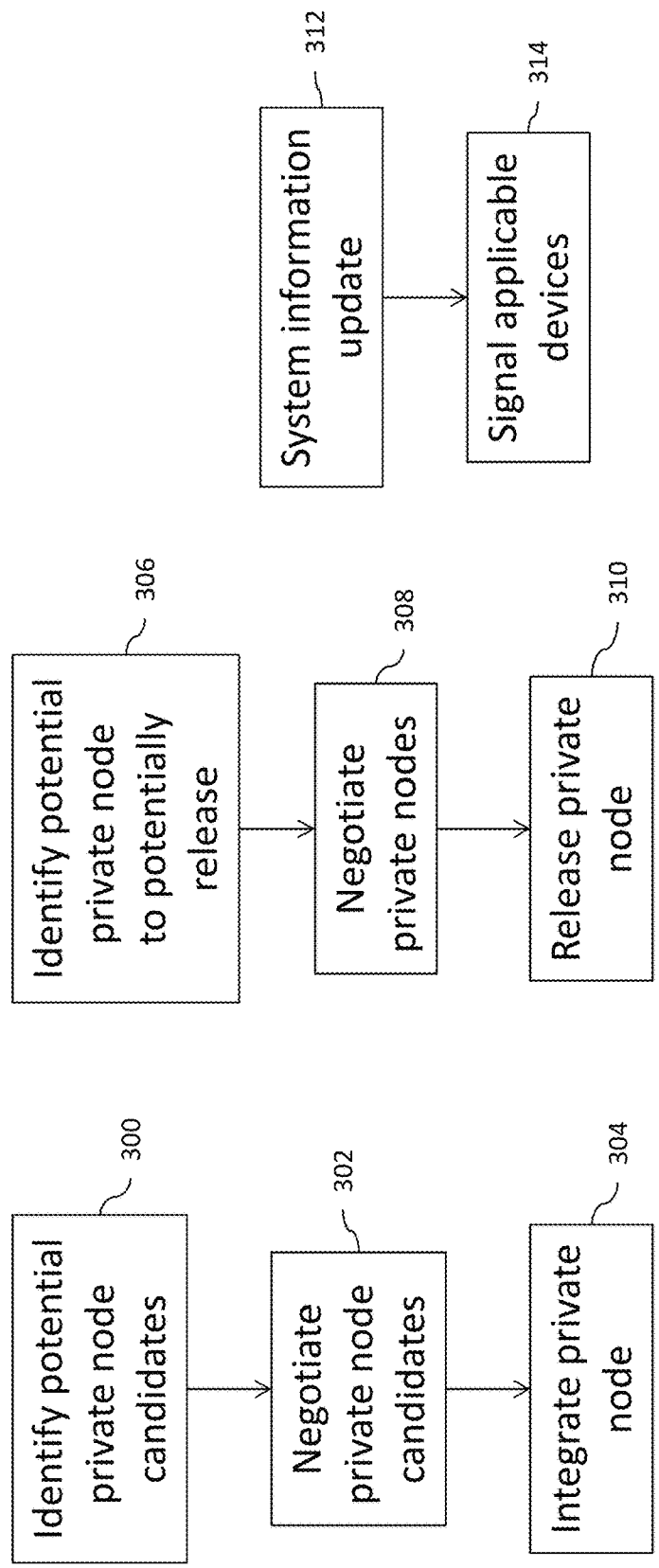

SYSTEM AND METHOD FOR AN AGILE WIRELESS ACCESS NETWORK

This patent application is a continuation of U.S. patent application Ser. No. 14/069,948, entitled "System and Method for an Agile Wireless Access Network" which was filed on Nov. 1, 2013, which claims priority to U.S. Provisional Application No. 61/831,296 filed on Jun. 5, 2013, entitled "System and Method for an Agile Wireless Access Network," which applications are hereby incorporated by reference herein in their entirety.

TECHNICAL FIELD

The present invention relates to a system and method for wireless communications, and, in particular embodiments, to a system and method for an agile radio access network.

BACKGROUND

Current wireless networks generally deploy loosely populated radio nodes (e.g., macrocell base stations (BSs)) to provide access link functionality to terminals (e.g., user equipment (UEs)) in the radio nodes' coverage areas. In contrast, future wireless networks are expected to be densely deployed heterogeneous networks having multiple types of radio nodes equipped with backhaul and switching/routing functionality and configurable access link functionality. For example, current wireless networks may deploy one or two macrocells per km$^2$. In contrast, future wireless networks may deploy several hundred low power radio nodes (e.g., microcells or picocells) per km$^2$. The number of privately deployed networks and nodes is also expected to significantly increase and may be integrated into these future networks.

Unfortunately, current radio access network's (RAN) backhaul infrastructure topography is generally fixed at deployment. A current radio node provides only limited wireless backhaul access functionality, and current networks are not equipped to handle on-demand bandwidth allocation for heterogeneous network nodes based on changes in network traffic requirements (e.g., quality of experience (QoE)) requirements, detected congestion, or predicted change in network load). Furthermore, dynamic configuration of radio node backhaul infrastructure and integration of private network nodes are also not available.

SUMMARY OF THE INVENTION

These and other problems are generally solved or circumvented, and technical advantages are generally achieved, by preferred embodiments of the present invention which provide a system and method for an agile wireless access network.

In accordance with an embodiment, a method for agile radio access network management includes determining, by a network controller, capabilities and neighborhood relations of radio nodes in the radio access network. The network controller then configures a backhaul network infrastructure for the radio access network in accordance with the capabilities and the neighborhood relations of the radio nodes.

In accordance with another embodiment, a network controller includes a processor and a computer readable storage medium storing programming for execution by the processor. The programming includes instructions to determine capabilities and neighborhood relations of radio nodes in an area of the radio access network controlled by the network controller and configure backhaul network infrastructure for the area of the radio access network in accordance with the capabilities of radio nodes and the neighborhood relations of the radio nodes.

In accordance with yet another embodiment, a network controller includes a processor and a computer readable storage medium storing programming for execution by the processor. The programming includes instructions to receive, from a network status analyzer, network traffic conditions in an area of a radio access network controlled by the network controller. The network controller receives from a network status analyzer, network traffic conditions in an area of a radio access network controlled by the network controller. The network controller determines from a node database, capabilities and neighborhood relations for radio nodes in the area of the radio access network. The network controller further determines, from a private node database, availability of privately deployed radio nodes in the radio access network and determines, form a resource pool database, network resource utilization information of the area of the radio access network. The programming includes instructions to configure backhaul network infrastructure for the area of the radio access network in accordance with the network traffic conditions, the capabilities of the radio nodes, the neighborhood relations of the radio nodes, the availability of the privately deployed radio nodes, and the network resource utilization information, signal the backhaul network infrastructure to one or more applicable end user terminals, one or more applicable radio nodes, one or more applicable privately deployed radio nodes, and a control plane of the area of the radio access network, and update the resource pool database and a topography database with the backhaul network infrastructure.

BRIEF DESCRIPTION OF THE DRAWINGS

For a more complete understanding of the present invention, and the advantages thereof, reference is now made to the following descriptions taken in conjunction with the accompanying drawing, in which:

FIGS. 3A-3C are flow charts of private network node integration in accordance with various embodiments.

DETAILED DESCRIPTION OF ILLUSTRATIVE EMBODIMENTS

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments are described in a specific context, namely an agile infrastructure for a radio access network (RAN). Various embodiments may also be applied, however, to a variety of different networks and network nodes.

Various embodiments provide a framework of an agile network infrastructure that performs on-demand backhaul network infrastructure configuration of operator-deployed network nodes as well as on-demand integration of private network nodes in accordance with network traffic conditions. A targeted framework for agile configuration of wireless backhaul infrastructure is provided to enable utilization of available backhaul resources to satisfy changing traffic conditions, detected congestion, anticipated changes in network load, anticipated migration of traffic load, to meet quality of experience (QoE) requirements, and the like.

An embodiment agile RAN infrastructure includes mechanisms/functionalities for on-demand backhaul and access link bandwidth management, on-demand backhaul link management (e.g., adding, steering, and removing nodes in an operator developed network), on-demand private fixed node management, and on-demand mobile node management. The agile RAN infrastructure may be dynamically configured based on network status, traffic load migration, and available network resources (e.g., both hard and soft-spectral resources).

Figure 1A:
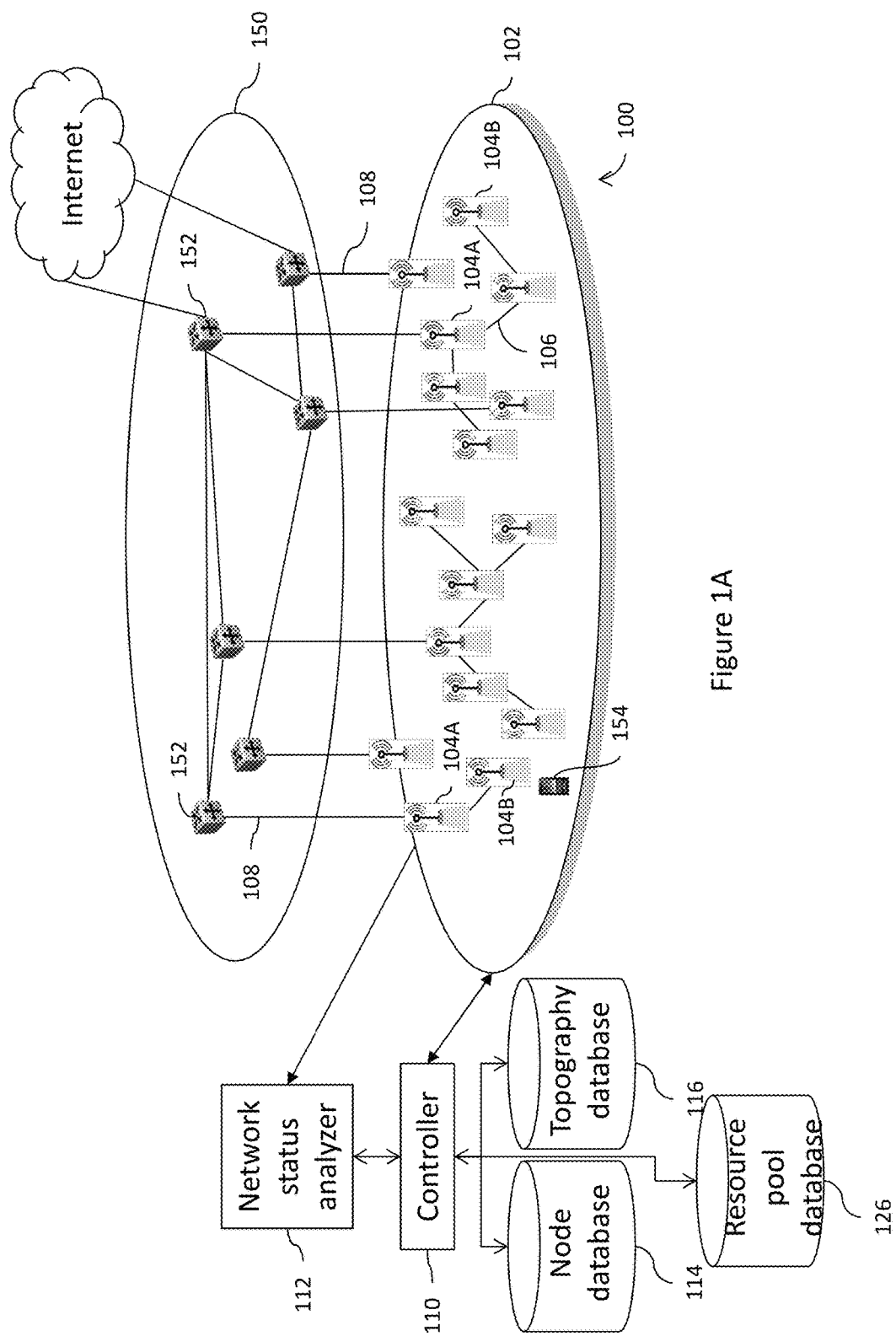
FIGS. 1A-1C are block diagrams of an agile radio access network in accordance with various embodiments.

FIG. 1A illustrates a network 100 in accordance with various embodiments. Network 100 allows for on-demand backhaul network infrastructure configuration and management (e.g., adding, removing, and steering backhaul links among network nodes). Network 100 includes a plurality of densely deployed operator cells such as radio nodes 104 (labeled 104A and 104B) in a geographic coverage area 102. For example, in network 100, there may be a hundred or more low power radio nodes 104 per km$^2$ in coverage area 102. Radio nodes 104 may be access networks (ANs) such as long term evolution (LTE) base station (BS) microcells, LTE BS picocells, radio network controllers (RNCs), WiFi access points (APs), future ANs, combinations thereof, and the like, which provide access link functionality for end-user terminals in area 102, such as user equipment (UE) 154. Furthermore, radio nodes 104 may support communications in accordance with various communications standards such as code divisional multiple access (CDMA), LTE, Global Systems for Mobile Communications (GMS), Universal Mobile Telecommunications System (UMTS), future communications standards, combinations thereof, or the like. Each radio node 104 may or may not be capable of communicating in accordance with more than one standard.

In network 100, each densely deployed radio node 104 may be adapted to provide an access link to specific end-user terminals (e.g., UE 154), for example, based on geography and received channel conditions of a terminal. Radio nodes 104 may provide end-user terminal specific over-the-air wireless access link interfaces.

Radio nodes 104 provide access link functionality to terminals through a core backhaul network 150, which may include a plurality of gateways 152 interconnected through wireline connections. Certain radio nodes (nodes 104A) may be directly connected to core backhaul network 150 through wireline backhaul links 108 to gateways 152. However, because radio nodes 104 are densely deployed, direct wireline backhaul links may not be practicable for all radio nodes 104. Therefore, certain radio nodes (nodes 104B) may have multihop connections to core backhaul network 150. That is, radio nodes 104B are connected to core backhaul network 150 through other radio nodes 104 using indirect backhaul links 106, which may be wireline or wireless backhaul links. Wireless backhaul links 106 may be narrow beam links configured at a higher radio frequency (RF) band than access links between a radio node 104 and a terminal (e.g., UE 154). These wireless backhaul links 106 may be very narrowly beam formed between the two applicable endpoint radio nodes 104 and be similar to a wireline link, causing minimal interference to other wireless communications in network 100. In order to support multihop connections, at least some radio nodes 104 have switching/routing functionality to forward packets from core backhaul network 150 to a target radio node 104 and vice versa. Other radio nodes 104, however, may not have switching/routing functionalities.

Generally, the number of hops refers to the number of nodes between a radio node 104B and a gateway 152 to core backhaul network 150. For example, a radio node 104B directly connected to a radio node 104A is one hop away, whereas a radio node 104B connected to a radio node 104A through another radio node 104B is two hops away. Although the maximum number of hops illustrated in FIG. 1A is three, other configurations having four or more hop connections between radio nodes and a backhaul network are contemplated in various embodiments depending to network configuration.

Radio nodes 104 may have one or more backhaul ports for backhaul links. That is, additional backhaul ports at a radio node 104 allows for additional backhaul links (both direct or indirect) to core backhaul network 150. Furthermore, radio nodes 104 may be capable of supporting communications on one or more carrier bandwidths. The number of supported backhaul ports and/or carriers may vary among radio nodes 104 in network 100. Thus, as described in greater detail below, network 100 may dynamically allocate backhaul link bandwidth for a radio node 104 by configuring the backhaul network infrastructure, for example, by activating/deactivating additional carriers, activating/deactivating additional backhaul links, or the like in accordance with radio node 104's capabilities and network traffic conditions.

Therefore, at least some radio nodes 104 are multifunction radio nodes (MFRN). That is, radio nodes 104 may support communications in accordance with one or more communications standards, one or multiple backhaul ports, one or more carriers, routing/switching functionality, configurable access link functionality, out of band sensing, combinations thereof, or the like.

A list of available nodes 104, neighborhood relations for nodes 104 (e.g., nearby nodes 104 with which backhaul connections could be established), and the capabilities of each node 104 in network 100 may be stored in a node database 114. Node database 114 may be created at the deployment of network 100 and may be updated whenever a radio node is added or removed from the network. In additional to radio node capability, node database 114 may include other relevant information on each radio node such as energy supply type (e.g., powerline or battery), location, or the like.

The topography of network 100 may be stored in a topography database 116. Topography database 116 may include information on the location of each node 104 and the connections between nodes 104 (e.g., indirect backhaul links 106) and core backhaul network 150. Connection information may identify the two nodes 104 at the endpoints of a backhaul link and the capacity (e.g., the bandwidth) of the link. This topography information may be determined at network deployment.

For example, the capacity and endpoints of wireline connections in network 100 are known at deployment. As another example, beam based backhaul links (e.g., an antenna array based link) may use transmission and reception alignment information to determine the endpoints of a link. The capacity of a beam based backhaul link may be estimated by received signal statistics between the nodes (e.g., a received signal to noise ratio (SINR)). As yet another example, other types of wireless backhaul links may use a specific protocol in a neighborhood discovery phase of network deployment. For example, a node 104 may broadcast a 'hello' message and receive responses from neighboring nodes. Based on the content and SINR of the responses, the node 104 may determine a list of neighboring nodes and the capacity of relevant links. An appropriate neighboring node may be selected to form a wireless link. This information may be signaled to the network and stored in topography database 116 and node database 114.

Network 100 may further include a resource pool database 126. Resource pool database 126 may track the hard/soft spectral resources utilization information for radio nodes in an area of network 100 (e.g., area 102). Hard spectral resource utilization information may include, for example, to the total number of ports at each radio node 104, the number of ports currently in use, and the number of available ports. Soft spectral resource utilization information may include, for example, the allocation of bandwidth and carriers among radio nodes 104 in network 100.

Topography database 116 and/or resource pool database 126 may be updated as connections in the network change (e.g., when the backhaul network infrastructure is reconfigured). Although node database 114, topography database 116, and resource pool database 126 are illustrated as separate databases in FIG. 1A, they may be co-located in the same database. Furthermore, they may be stored in the same or separate locations.

Network 100 includes a network status analyzer 112 that monitors traffic conditions in network 100 over a certain time/geographic area. Traffic conditions may include traffic load, anticipated traffic load, real-time traffic congestion, quality of experience (QoE) requirements, or the like. Network status analyzer 112 may monitor traffic load over a certain time/geographic area and predict future traffic load of network 100 based on historical statistics. Network status analyzer 112 may also monitor and detect congestion in network 100 based on real-time network statistics such as buffer sizes and packet/data drop rates.

For example, for a given geographical area (e.g., area 102), traffic load may be recorded hourly every day over the course of a week. This recorded traffic load information may be used to predict future traffic load for network 100 based, e.g., on time of day or day in a week. At a given time in the future, the traffic load in a specific geographic area can be calculated as a sum of traffic rates of all terminals in the area during a similar time period (e.g., the same time of day). As another example, traffic load prediction may predict traffic migration patterns based on mobility prediction of each terminal in a geographical area of network 100, the applications running on terminals in network 100, or the like.

As another example, congestion may be identified in network 100 based on the status of a buffer associated with a backhaul link (e.g., either direct backhaul link 108 or indirect backhaul link 106). Congestion in a link may be detected if a buffer size (e.g., bytes in a queue) is persistently larger than a pre-defined threshold for a certain time period (e.g., a few minutes) or if the buffer size is larger than a pre-defined threshold more than a certain percentage (e.g., 90%) of time. As another example, congestion may be detected if the overflow status of a buffer on a link is at a certain level (e.g., the rate of data/packet drop due to overflow during a period time is higher than a pre-defined threshold). As yet another example, the packet queue delay associated with a link may be used to detect congestion. For example, average packet delay over a certain period of time is higher than a pre-defined threshold or a certain percentage (e.g., 90%) of time the packet delay is larger than a pre-defined threshold.

QoE requirements may also be a factor for evaluating traffic conditions. For example, a lack of network backhaul capacity may be identified when an experienced video quality is not as good as expected (e.g., black out time exceeds a threshold). Thus, network backhaul capacity for the user may need to be boosted to meet a desired or required QoE level. Delivered QoE may be detected by network status analyzer 112 or a separate QoE analyzer device.

As network conditions over network 100 change over time, the network backhaul infrastructure (e.g., the backhaul links) adapts to the changes through on-demand configuration of the backhaul network infrastructure by controller 110. For example, network status analyzer 112 signal network traffic conditions, including any changes, to a controller 110, which dynamically reconfigures backhaul links in network 100 in accordance with traffic load, traffic load prediction, detected congestion, QoE requirements, network node capability, and/or neighborhood relations. Network node capability, network resource availability, and neighborhood relations information may be based on information stored in node database 114, topography database 116, and/or resource pool database 126. For example, as will be explained in greater detail below, controller 110 may add backhaul links, add additional carrier bandwidth, or steer a backhaul connection to a different node in accordance with node capability and neighborhood relations in anticipation of a higher traffic load or to alleviate congestion.

Controller 110 may further dynamically configure access links for end user terminals (e.g., UEs) in network 100 in accordance with traffic conditions, QoE requirements, terminal equipment capability, and the like. That is, controller 110 may dynamically select an appropriate radio node (e.g., radio nodes 104 or 106), dynamically allocate bandwidth to the access link, or the like. The dynamic configuration of access links may take into account the access link's specification (e.g., the air interface type such as UMTS, LTE, or a future air interface), the access link's specific configuration (e.g., waveform, frame structure, or the like), and available access link carriers/bandwidth (e.g., antenna configuration).

Controller 110, network status analyzer 112, resource pool database 126, node database 114, and topography database 116 may be separately located in individual devices, co-located in a single radio node 104, co-located amongst multiple radio nodes 104, combinations thereof, or the like. Furthermore, network 100 is illustrated as having only one controller 110 and one network status analyzer 112 for simplicity. However, network 100 may have multiple controllers 110 dynamically reconfiguring backhaul links and/or multiple network status analyzers 112 analyzing network traffic conditions. The number of controllers 110 and/or network status analyzers 112 may depend on the size of network 100 and the complexity of network configuration. Furthermore, controllers 110/analyzers 112 may be coordinated by a regional or other higher-tier controller/analyzer. Of course, multiple tiers of controller hierarchy including, for example, a global controller and/or a global network status analyzer may also be implemented depending on network size, complexity, and/or configuration.

Figure 1B:
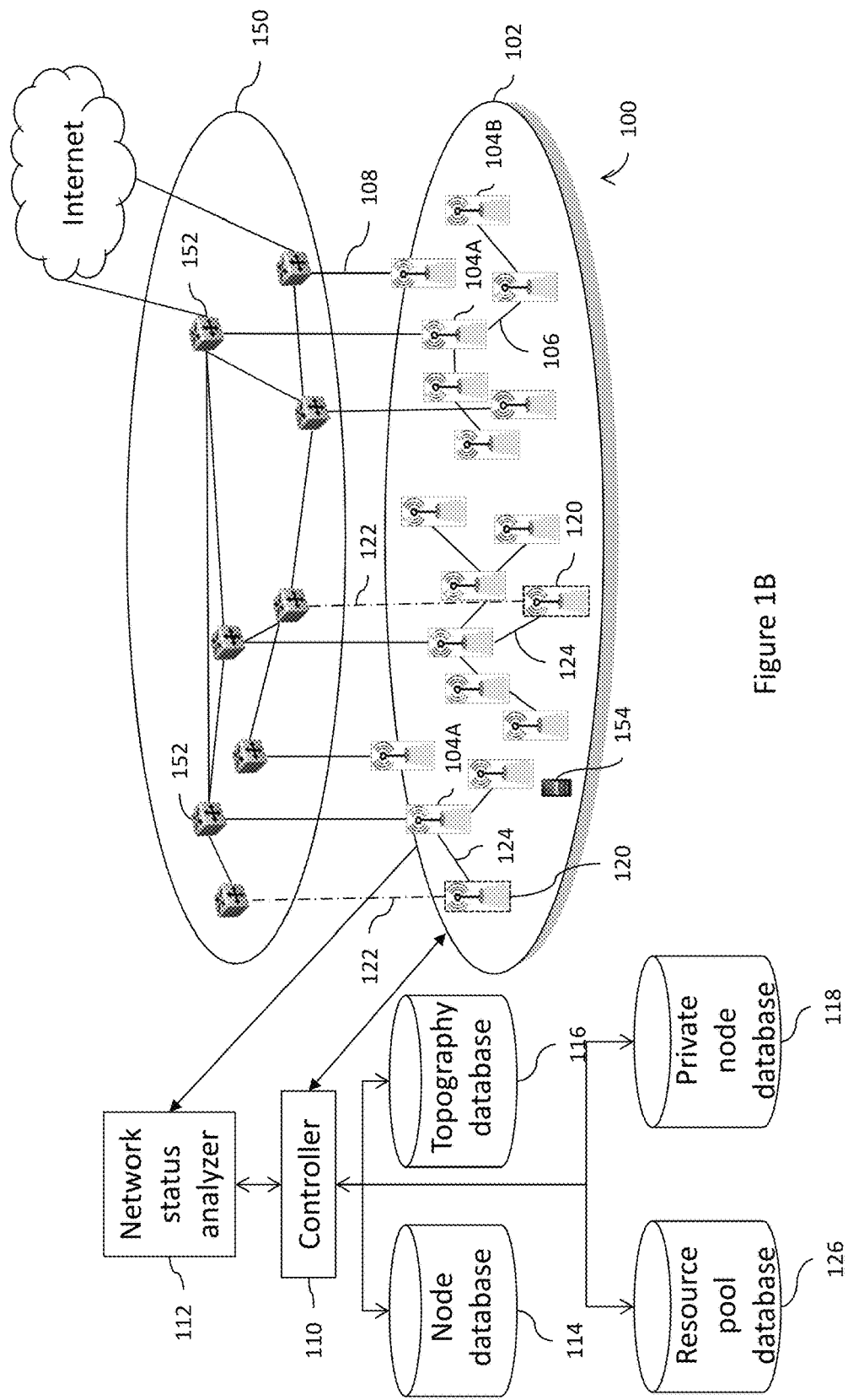

In addition to operator deployed radio nodes 104, network 100 may include a plurality of privately (or any other operator) deployed network nodes 120 as illustrated by FIG. 1B. Privately deployed radio nodes 120 may be radio nodes covering a limited area deployed by an enterprise, small business, residence, or the like. Private nodes 120 may provide downlink and/or uplink forwarding assistance to network 100, for example, during high traffic load times or to alleviate congestion. Operators of private nodes may agree to provide such assistance, for example, in exchange for operator network credits at a future time. The exchange rate for provided assistance and operator network credits need not be one to one.

In order to provide uplink and/or downlink forwarding assistance, a private node 120 may have a connection 122 to a gateway 152 of core backhaul network 150. Connections 122 may be wireless or wireline connections. Alternatively or in addition to connections 122, private nodes 120 may have connections 124 with operator-deployed radio nodes 104. Connections 124 may be formed using WiFi connections, cellular connections, or the like. There may be mutual authentication between the operator deployed radio nodes and the private radio nodes. Traffic forwarded through the private nodes may be encrypted between the end-user terminal and the operator's gateways for security.

Discovery of private nodes may be done by network 100 at deployment of private nodes, at private node registration, at boot-up, through polling from network operators or other third party, or the like. Controller no may integrate private nodes in accordance with network traffic conditions. For example, private nodes may be integrated in anticipation of higher traffic load, traffic migration, detected congestion, an operator network overload due to an emergency, single backlink failure, network crash, to meet a QoE requirement, or the like. At a later time, private nodes may be released if network conditions improve (e.g., emergency situation ends, backlink failure recovers, heavy traffic load lightens, heavy traffic load migrates, or the like). Private nodes may further be released at the private node's discretion. For example, at integration, conditions may be established such as a finite time duration for connection, and the controller releases the private node at the expiration of the finite time duration.

A private node database 118 may include information on available private nodes 120 similar to the information stored in node database 114. For example, private node database 118 may identify each available private node and include information for each private node 120 relating to their capability (e.g., number of backhaul ports, radio frequency capability in both access links and backhaul, storage capability, and the like), energy supply type (e.g., battery or powerline), node physical layer identity, location, neighborhood relations (e.g., other nodes with which a connection may be established with link capacity higher than a threshold), or the like. When a private node is integrated, a network device (e.g., node 104 or terminal) may monitor statistics regarding the private node such as capacity of the link. When a private node is released, this information may be used to update the private node database.

This private node database information may be provided to controller 110 so that controller 110 may integrate private nodes as needed to dynamically reconfigure backhaul network infrastructure in network 100 in accordance with traffic conditions. Controller no identifies potential private node candidates, negotiates with the private node candidates regarding integration (e.g., duration, credits, allocated bandwidth, or the like), and informs the node's control plane regarding the integration. When a private node is no longer needed, controller 110 identifies potential private nodes to release, negotiates release terms (e.g., update credits), and informs the node's control plane regarding the release. Thus, through the integration of private nodes, network 100 leverages consumer sites and additional backhaul resources, reducing capital expenditure and operational expenditure.

Furthermore, network 100 may include mobile private nodes, which may provide additional backhaul network support. Mobile private nodes are nodes that are in transit and are capable of forwarding data/packets to a terminal as needed depending on network traffic conditions. Examples of mobile nodes include when both the mobile node and the terminal move synchronously (e.g., both devices are onboard the same moving vehicle), when the mobile node and terminal move asynchronously (e.g., a vehicular network), and when the mobile node moves and terminal is fixed (e.g., passing-by).

Integration/release operations of mobile private are similar to those for fixed private nodes except that network 100 may rely on knowledge of private devices in movement. This knowledge may be acquired, for example, by using a neighborhood discovery mechanism at a radio node requiring assistance. The controller may then transmit requests to identified neighboring mobile nodes asking for assistance.

Figure 1C:
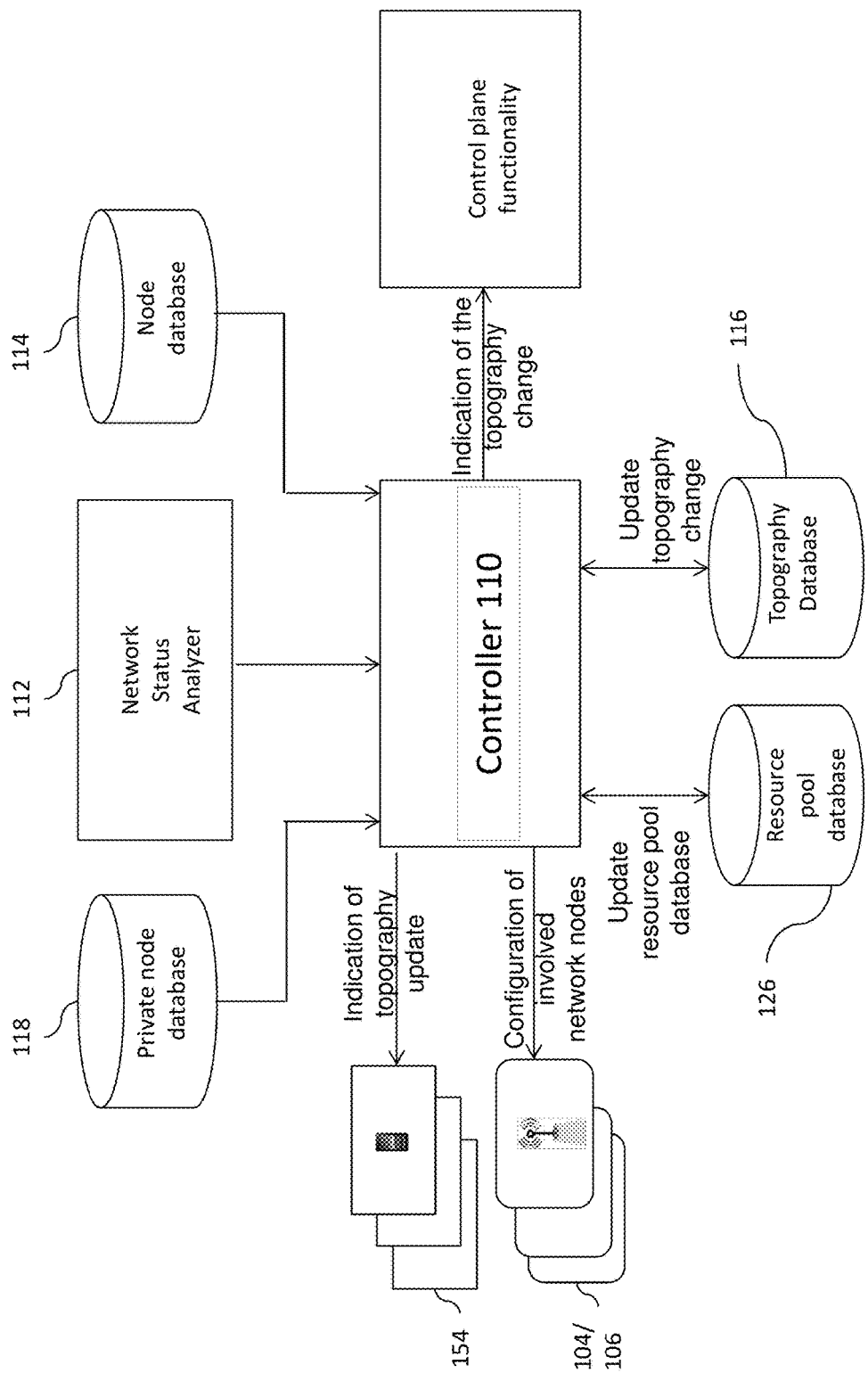

FIG. 1C illustrates a block diagram of controller 110 and various network entities in communication with controller 110. As explained above, controller 110 dynamically configures backhaul network infrastructure and/or access links in accordance with network traffic conditions. Network traffic conditions (e.g., network traffic load prediction, received QoE, detected congestion, and the like) may be signaled to controller 110 from a network status analyzer 112. The dynamic configuration of backhaul infrastructure/access links may also take into account received information regarding the configuration and neighborhood relations of various network radio nodes 104 (stored in node database 114), available private radio nodes 106 (stored in private node database 118), network resource utilization (stored in a resource pool database 126), and/or information on current network topography (stored in topography database 116). Controller no signals configuration of backhaul network infrastructure/access links to applicable radio nodes 104 and 106, which may also be referred to as the data plane. For various networks where control plane and data plane functionality is separated (e.g., in a software defined network (SDN), controller 110 may separately signal the control plan of the change in network topography so that transmissions may be forwarded correctly.

Controller 110 may further signal indications of network topography to end-user terminals (e.g., UEs 154) so that the end-user terminals may establish access links with an applicable network node accordingly. Controller 110 may signal an indication of topography change every time network topography for a particular end-user terminal is updated. Furthermore, controller 110 may update resource pool database 126 and topography database 116 to reflect any changes in network topography and/or resource utilization (e.g., when a backhaul link is added or carrier bandwidth is reconfigured) as necessary due to reconfiguration.

Figure 2A:
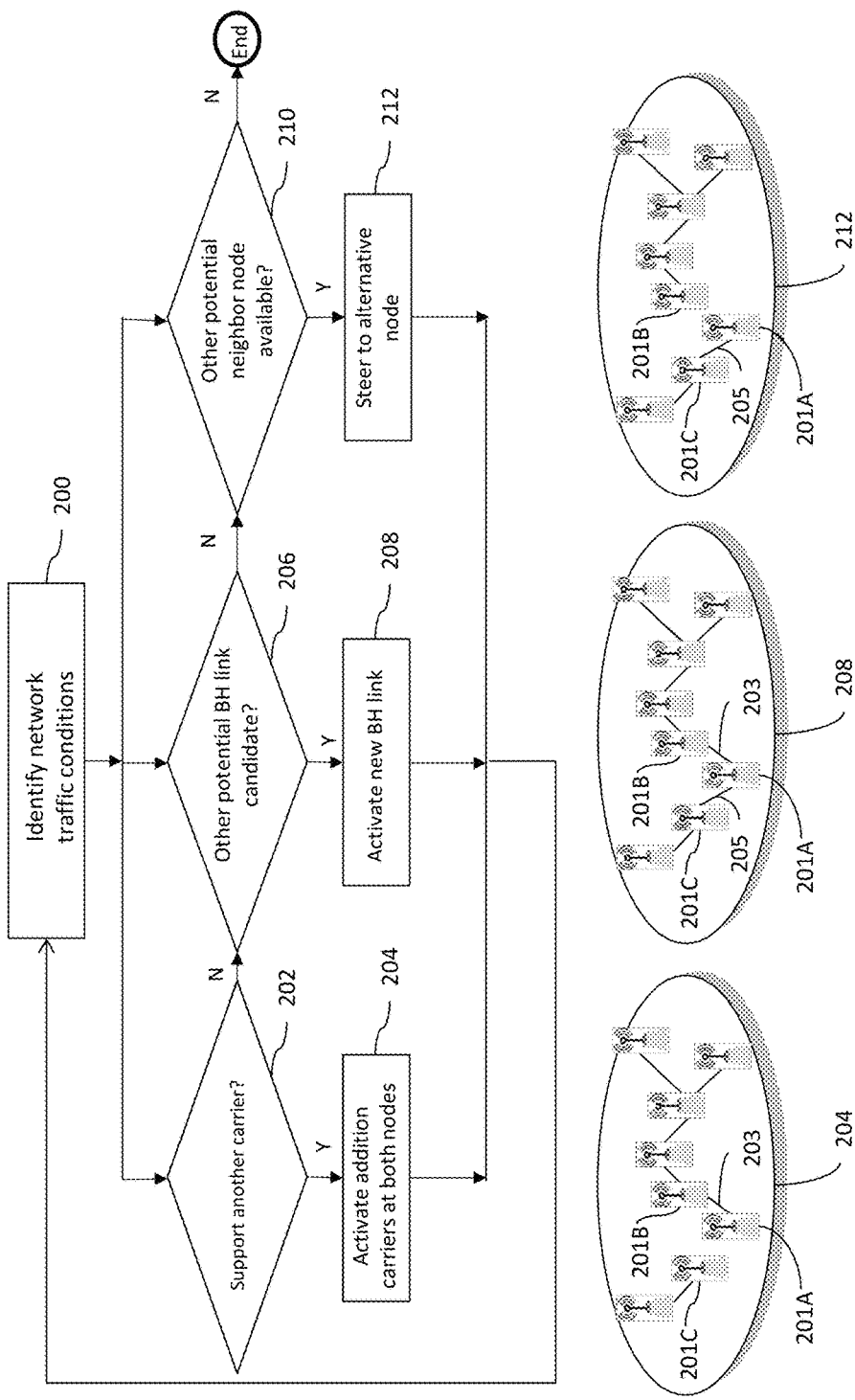
FIGS. 2A-2C are flow charts of agile network infrastructure management in accordance with various embodiments.

FIG. 2A illustrates an example algorithm for dynamically configuring backhaul network infrastructure by a network controller (e.g., controller 110) in a sequential manner. In step 200, a controller identifies network traffic conditions in a network (e.g., network 100). For example, the controller may receive network traffic conditions from a network status analyzer, which call for additional bandwidth in a backhaul link (e.g., link 106 or 108) because of detected congestion or predicted increased traffic load, for example, due to a change in time or day or geography around the link.

In steps 202 through 206, the controller determines capabilities and neighborhood relations of network nodes in the network. In step 202, the controller determines if the two network nodes on either end of the backhaul link can support an additional carrier's bandwidth. The controller may identify the nodes on either end of the link and determine this capability by referencing information stored in a node database and/or a topography database. If so, then in step 204, the controller activates one or more additional carriers at both nodes to increase backhaul bandwidth. For example, step 204 is also illustrated in block diagram form, and the controller may add additional carriers to nodes 201A and 201B in order to provide more bandwidth as needed to backhaul link 203.

If the nodes do not support additional carriers, then in step 206, the controller determines if any other potential backhaul link candidates are available for either node at the ends of the backhaul link. The controller may determine the availability based on node capability, network resource utilization information, and neighborhood relations information stored in a node database, resource pool database, and/or a topography database. For example, the controller may determine if either node has additional backhaul ports and available neighboring nodes to establish an additional link. If so, then in step 208, the controller activates a new backhaul link. For example, step 208 is also illustrated in block diagram from, and the controller may add an additional backhaul link 205 between nodes 201A and a separate node 201C to provide more bandwidth to node 201A as needed based on network conditions (e.g., anticipated network load or congestion). Note that node 201C may be an operator deployed node or a privately deployed node.

If there are no other potential backhaul link candidates available, the controller determines if there are other potential neighboring nodes with a better connection available. The controller may determine the availability based on neighborhood relations information stored in a node database and/or a topography database. If so, then in step 212, the controller steers the backhaul link to the alternative node. For example, step 212 is also illustrated in block diagram form, and the controller may steer (i.e., disconnect a backhaul link and connect a different backhaul link) the link between nodes 201A and 201B to a backhaul link 205 between nodes 201A and 201C. This may be done, for example, if the backhaul link between nodes 201A and 201C is superior to the link between nodes 201A and 201B due to more favorable network conditions.

If no other potential neighbor nodes are available, then the algorithm ends as additional improvements in network condition through reconfiguring the network's backhaul infrastructure may not be practicable. After each step 204, 208, or 212, the network status analyzer may continually monitor the network to determine if additional reconfiguration is necessary to improve network conditions (e.g., based on identified congestion or anticipated increased traffic load). Furthermore, while a particular sequential order for reconfiguring a network is illustrated in FIG. 2A, alternative embodiments may include a different sequence of steps. For example, the controller may attempt to activate a new backhaul link (i.e., step 208) before attempting to activate additional carriers (i.e., step 204).

Figure 2B:
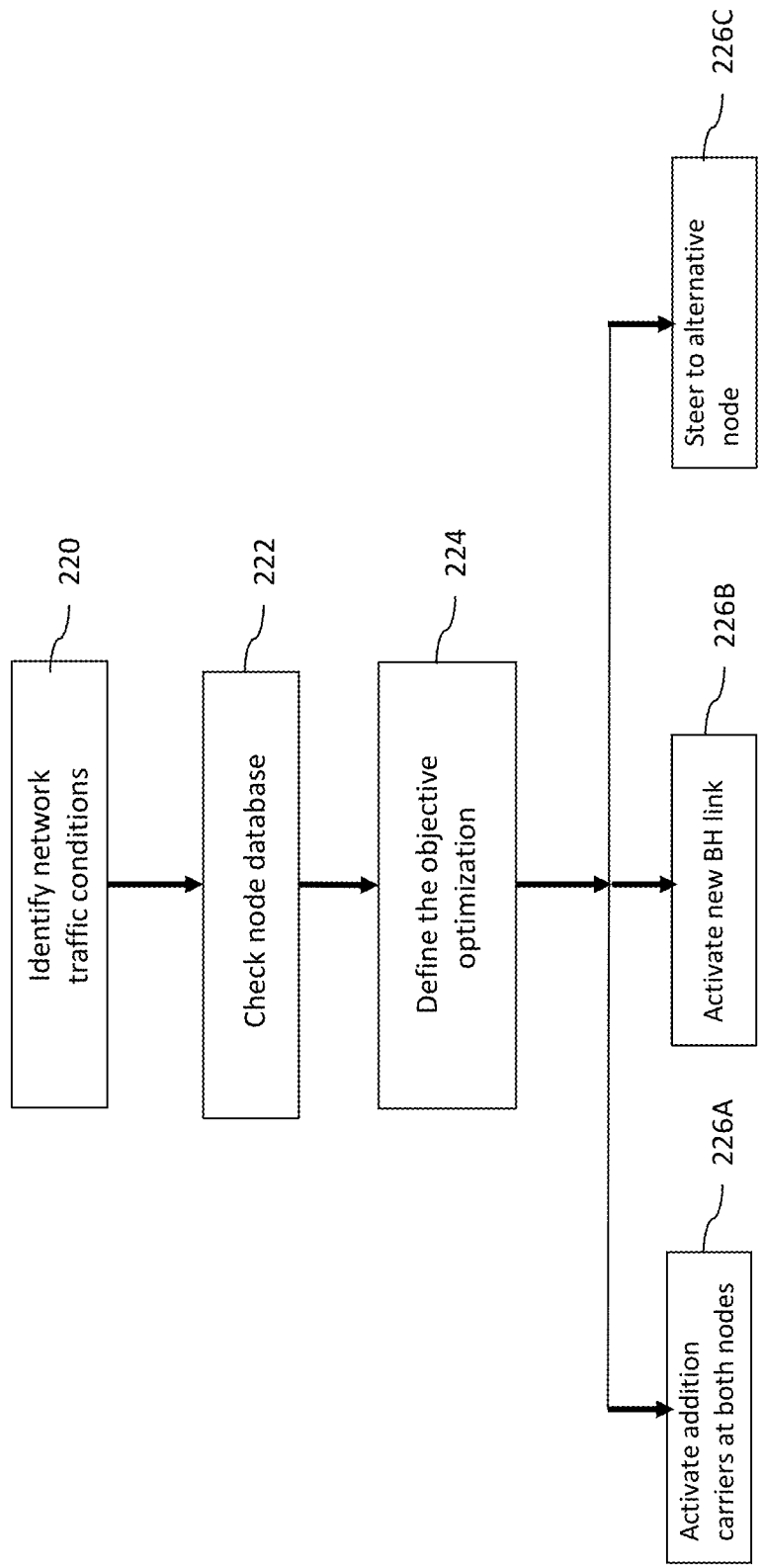

FIG. 2B illustrates an example algorithm for dynamically configuring backhaul network infrastructure by a network controller (e.g., controller 110) in an optimized manner. In step 220, a controller identifies network traffic conditions. For example, the controller may receive network traffic conditions from a network status analyzer, which call for additional bandwidth in a backhaul link (e.g., link 106 or 108) because of detected congestion or predicted increased traffic load due to a change in time or day or geography around the link.

In step 222, the controller determines neighborhood relations, network node capabilities, topography, and/or network resource availability in the existing network, for example, by checking a node database, a private node database, a resource pool database, and/or a topography database. In step 224, the controller defines an objective network infrastructure optimization, for example, a desired network topography needed in accordance with network traffic conditions. In step 226, the controller dynamically reconfigures the backhaul network infrastructure in accordance with the defined objective optimization, for example, by activating additional carriers at applicable nodes (step 226A), activating new backhaul links (step 226B), and/or steering backhaul links to alternative nodes (step 226C). Unlike the process illustrated in FIG. 2A, the controller may reconfigure the network backhaul infrastructure by applying multiple different approaches (e.g., adding new carriers, adding new backhaul links, or steering to alternative nodes) simultaneously, as opposed to sequentially.

Figure 2C:
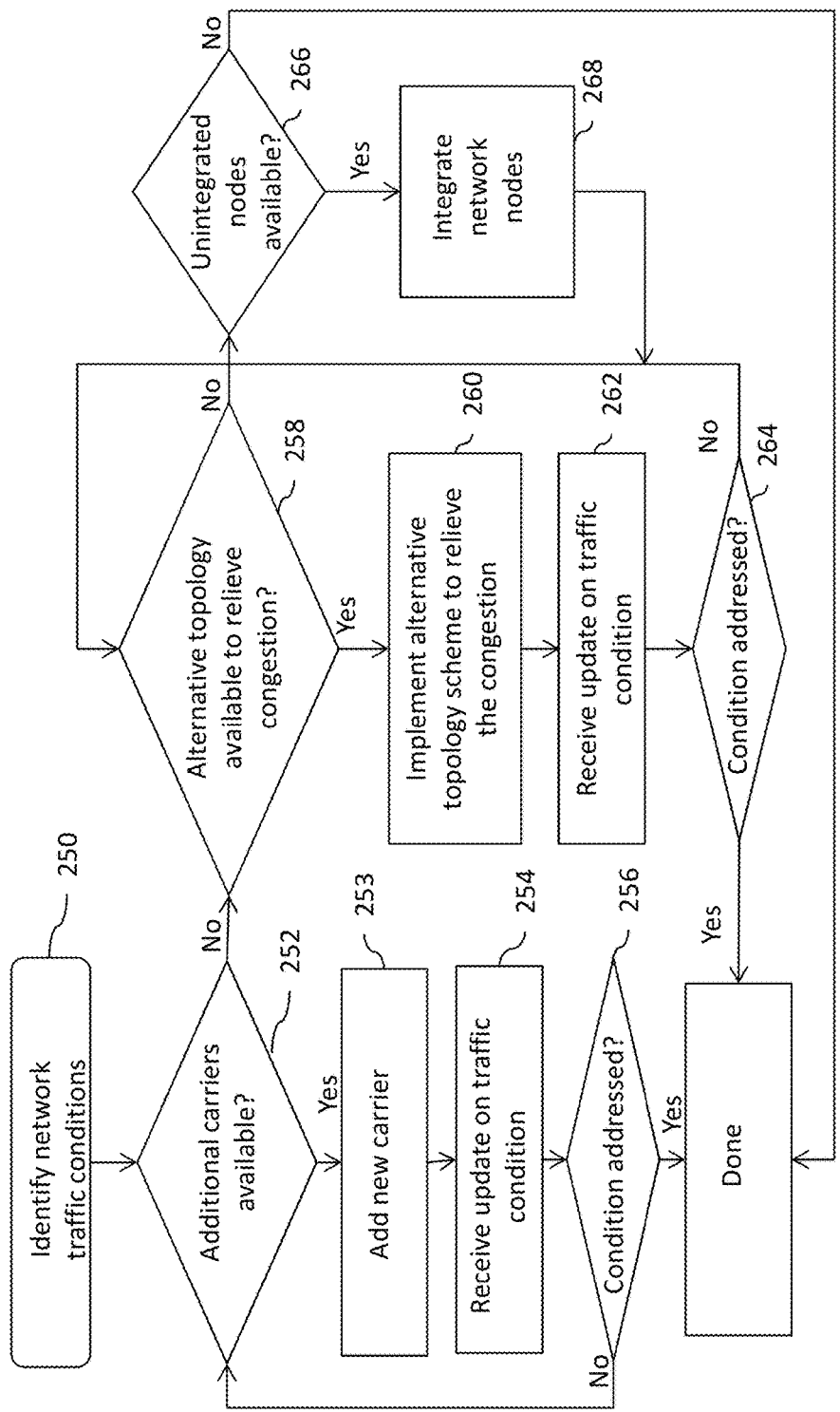

For example, FIG. 2C illustrates a flow chart of an example network optimization in accordance with the optimized backhaul network infrastructure reconfiguration illustrated in FIG. 2B. In step 250, a controller identifies a change in traffic condition. For example, the network status analyzer may identify congestion in a backhaul link or predict increased traffic load due to a change in time or day or geography around the link. The network status analyzer may signal this network traffic condition to the controller.

In step 252, the controller determines if additional carriers are available at endpoint nodes of a backhaul link where additional network resources (e.g., bandwidth) are needed. If so, in step 253, the controller adds additional carriers to applicable network nodes. In step 254, the controller receives an update on network traffic conditions. In step 256, the controller determines if the network traffic conditions are addressed (e.g., if congestion is relieved). If so, the process is over. Otherwise, the controller may attempt to add additional carriers until the network traffic conditions are addressed.

If no additional carriers may be added, in step 258, the controller determines if any alternative network topologies may be implemented to provide alternative backhaul infrastructures in accordance with network traffic requirements. These alternative topologies may be preconfigured by a controller based on network node capabilities and neighborhood relations amongst nodes. For example, these topography alternatives may include various different direct/indirect backhaul link configurations for adding additional backhaul links and/or steering different backhaul links. If an alternative network topography is available, in step 260 the controller selects and implements one of the alternative topographies in accordance with the network traffic conditions. In step 262, the controller receives an update on network traffic condition, for example, from a network traffic analyzer. In step 264, the controller determines if the network traffic conditions are addressed (e.g., if congestion is relieved or anticipated traffic load is met). If so, the process is over. Otherwise, the controller may attempt to implement another alternative topography, if available, to address the network traffic conditions.

If no additional network topography alternatives are available (or if no alternative topographies can improve traffic conditions), then in step 266, the controller determines if there are any unintegrated network nodes. These unintegrated network nodes may be newly deployed operator nodes or private nodes. If not, the process is over, and the controller determines no additional reconfigurations are available to address the network traffic conditions. If unintegrated network nodes are available, the controller integrates these network nodes into an alternative topography scheme in step 268. Thus, by implementing various alternative network topologies, the controller may dynamically reconfigure the topography of the network to address network traffic conditions in an optimized manner.

FIGS. 3A-3C illustrates flow diagrams for the integration/release of private nodes in accordance with various embodiments. Private nodes may be integrated to provide data uplink/downlink forwarding assistance in accordance with traffic conditions.

FIG. 3A illustrates a flow diagram for integrating a private node (either fixed or mobile). In step 300, the controller identifies potential private node candidates based on, for example, a private node database. In step 302, the controller negotiates with the private node regarding integration. For example, negotiations may include details regarding duration, rate, credit, or the like. In step 304, the controller integrates the private node by activating a logical interface with the private node's control plane for receiving control signaling (e.g., a forwarding table). The controller may further inform other network control devices (e.g., a software defined network traffic engineer (SDN-TE)) of the infrastructure change and relevant information, such as, change in infrastructure topography, link capacity of the new access link and/or backhaul link, interface specification, transmission power limit, spectral efficiency (SE) estimation of an end-user terminal (for access links), and the like.

FIG. 3B illustrates a flow diagram for releasing a private node (either fixed or mobile). Private nodes may be released, for example, based on integration conditions (e.g., after a negotiated duration of time), a change in end-user terminal location, or if network traffic conditions improve (e.g., heavy traffic load in an area becomes light, heavy traffic load migrating away from one area, or the like). In step 306, the controller identifies potential private node candidates to release, for example, based on a change in traffic conditions or private node availability. In step 308, the controller negotiates with the private node regarding release. For example, negotiations may include details regarding received credit updates or the like. In step 310, the controller releases the private node by releasing the local interface to the network control plane and updating any credits. The controller may further inform other network devices (e.g., SDN-TE) of the private node's release and relevant information such as change in infrastructure topography, obtained SE statistics of the served end-user terminal, private node database updates (e.g., SE for served locations), and the like.

FIG. 3C illustrates managing the end-user terminal connection with a private node. In step 312, the system is updated with information regarding a private node and change in network topography. For example, the system information update may occur when a private node is integrated or released. In step 314, the controller indicates (e.g., in a unicast transmission) to the applicable end-user terminal(s) to establish a physical connection with the private node or to disconnect from a private node. If the indication is to establish a physical connection, the controller may signal related information, such as, CellID or the like. If the indication is to disconnect from the private node, the controller may also signal to the end-user terminal to stop monitoring/detecting the signals from the private node.

Figure 4:
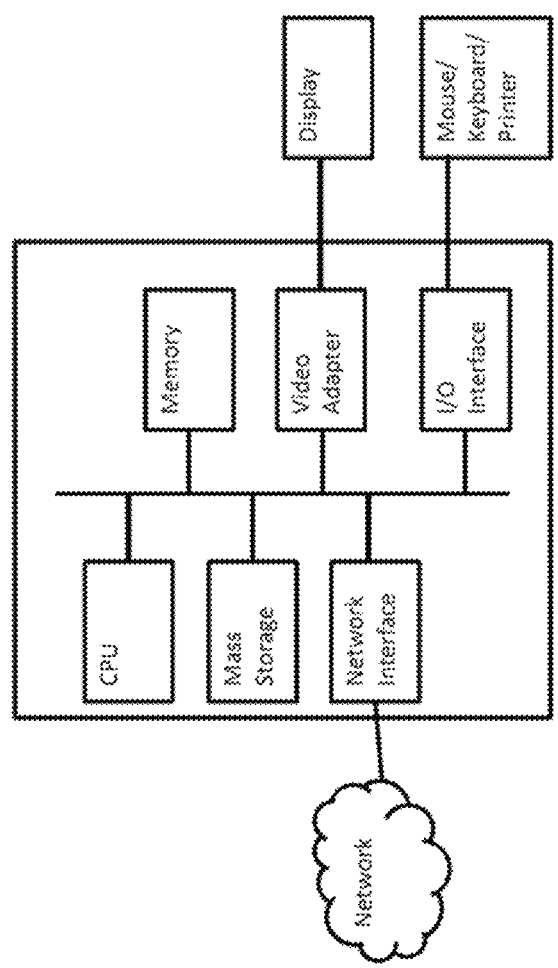
FIG. 4 is a block diagram of a computing system, for implementing, for example, the devices and methods described herein, in accordance with an embodiment.

FIG. 4 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for dynamically configuring a radio access network (RAN) associated with a wireless network, the method comprising:
receiving, at a network infrastructure controller, an indication of a change in traffic load in a part of the RAN;
selecting, by the network infrastructure controller, a node from nodes associated with a private network in accordance with the part of the RAN associated with the indication, in accordance with information associated with the indication, and in accordance with characteristics of the nodes stored in a private radio node database, the characteristics of the nodes comprising energy consumption information associated with the nodes;

dynamically reconfiguring, by the network infrastructure controller, a backhaul network infrastructure of the RAN, wherein the dynamically reconfiguring comprises:

transmitting an instruction, from the network infrastructure controller to the selected node, to add the selected node to the RAN or to remove the selected node from the RAN to change a topology of the RAN for serving a plurality of UEs in accordance with the change in traffic load in the part of the RAN; and transmitting, from the network infrastructure controller to a traffic engineering controller, a notification of a change in the topology of the RAN caused by the instruction to add or remove the selected node from the RAN.

2. The method of claim 1, further comprising identifying, by the network infrastructure controller, network traffic conditions in the RAN, wherein selecting the selected node comprises selecting the selected node in accordance with the network traffic conditions.

3. The method of claim 2, wherein identifying the network traffic conditions comprises receiving, from a network status analyzer, information obtained when the network status analyzer performs at least one of:
monitoring network traffic load;
predicting network traffic load;
predicting network traffic migration;
detecting congestion; or
detecting delivered quality of experience (QoE) levels.

4. The method of claim 1, wherein selecting the selected node comprises:
identifying potential privately deployed radio nodes for integration into the RAN;
negotiating integration terms with the potential privately deployed radio nodes; and
activating a logical interface between the RAN and a control plane of at least one potential privately deployed radio node.

5. The method of claim 4, wherein at least one potential privately deployed radio node comprises a mobile privately deployed radio node.

6. The method of claim 1, wherein the RAN comprises a node database identifying each of a plurality of operator deployed radio nodes in the RAN and information regarding each of the plurality of operator deployed radio nodes, wherein the information comprises information on at least one of operator deployed radio node capability, energy supply type, neighborhood relations, or location.

7. The method of claim 6, wherein the information on operator deployed radio node capability comprises information on at least one of a number of backhaul ports at the operator deployed radio node, communications standards supported by the operator deployed radio node, radio frequency capability in an access link, radio frequency capability in a backhaul link, or storage capacity.

8. The method of claim 1, further comprising adapting, by the network infrastructure controller, wireline backhaul connections and multi-hop backhaul connections for a plurality of operator deployed radio nodes in the RAN in accordance with capabilities and neighborhood relations of the operator deployed radio nodes, network resource utilization information, and locations of the operator deployed radio nodes.

9. The method of claim 8, wherein adapting the wireline backhaul connections and the multi-hop backhaul connections comprises adapting the wireline backhaul connections and the multi-hop backhaul connections sequentially.

10. The method of claim 8, wherein adapting the wireline backhaul connections and the multi-hop backhaul connections comprises configuring one or more alternative backhaul network infrastructure topographies and selecting one of the one or more alternative backhaul network infrastructure topographies.

11. The method of claim 1, further comprising:
in response to the selecting in accordance with characteristics of the nodes comprising the energy consumption information associated with the nodes:
changing the topology of the RAN by adapting backhaul connections for radio nodes in the RAN for serving the plurality of UEs.

12. A network controller comprising:
a processor; and
a non-transitory computer readable storage medium storing programming for execution by the processor, the programming including instructions to:
receive an indication of a change in traffic load in a part of a radio access network (RAN) associated with a wireless network;
select a node from nodes associated with a private network in accordance with the part of the RAN associated with the indication, in accordance with information associated with the indication, and in accordance with characteristics of the nodes stored in a private radio node database, the characteristics of the nodes comprising energy consumption information associated with the nodes;
dynamically reconfigure a backhaul network infrastructure of the RAN, wherein the instructions to dynamically reconfigure the backhaul network infrastructure comprise instructions to:
transmit an instruction to the selected node to add the selected node to the RAN or to remove the selected node from the RAN to change a topology of the RAN for serving a plurality of UEs in accordance with the change in traffic load in the part of the RAN; and
transmit to a traffic engineering controller a notification of a change in the topology of the RAN caused by the instruction to add or remove the selected node from the RAN.

13. The network controller of claim 12, wherein the programming further includes instructions to identify network traffic conditions in the RAN, wherein selecting the selected node comprises selecting the selected node in accordance with the network traffic conditions.

14. The network controller of claim 13, wherein identifying the network traffic conditions comprises receiving, from a network status analyzer, information obtained when the network status analyzer performs at least one of:
monitoring network traffic load;
predicting network traffic load;
predicting network traffic migration;
detecting congestion; or
detecting delivered quality of experience (QoE) levels.

15. The network controller of claim 12, wherein selecting the selected node comprises:
identifying potential privately deployed radio nodes for integration into the RAN;

negotiating integration terms with the potential privately deployed radio nodes; and activating a logical interface between the RAN and a control plane of at least one potential privately deployed radio node.

16. The network controller of claim 15, wherein at least one potential privately deployed radio node comprises a mobile privately deployed radio node.

17. The network controller of claim 12, wherein the RAN comprises a node database identifying each of a plurality of operator deployed radio nodes in the RAN and information regarding each of the plurality of operator deployed radio nodes, wherein the information comprises information on at least one of operator deployed radio node capability, energy supply type, neighborhood relations, or location.

18. The network controller of claim 17, wherein the information on operator deployed radio node capability comprises information on at least one of a number of backhaul ports at the operator deployed radio node, communications standards supported by the operator deployed radio node, radio frequency capability in an access link, radio frequency capability in a backhaul link, or storage capacity.

19. The network controller of claim 12, wherein the programming includes further instructions to adapt wireline backhaul connections and multi-hop backhaul connections for a plurality of operator deployed radio nodes in the RAN in accordance with capabilities and neighborhood relations of the operator deployed radio nodes, network resource utilization information, and locations of the operator deployed radio nodes.

20. The network controller of claim 19, wherein adapting the wireline backhaul connections and the multi-hop backhaul connections comprises adapting the wireline backhaul connections and the multi-hop backhaul connections sequentially.

21. The network controller of claim 19, wherein adapting the wireline backhaul connections and the multi-hop backhaul connections comprises configuring one or more alternative backhaul network infrastructure topographies and selecting one of the one or more alternative backhaul network infrastructure topographies.

22. A non-transitory computer-readable device having instructions stored thereon that, when executed by at least one computing device, cause the at least one computing device to perform operations for dynamically configuring a radio access network (RAN) associated with a wireless network, the operations comprising:

receiving an indication of a change in traffic load in a part of the RAN;

selecting a node from nodes associated with a private network in accordance with the part of the RAN associated with the indication, in accordance with information associated with the indication, and in accordance with characteristics of the nodes stored in a private radio node database, the characteristics of the nodes comprising energy consumption information associated with the nodes;

dynamically reconfiguring a backhaul network infrastructure of the RAN, wherein the dynamically reconfiguring comprises:

transmitting an instruction, to the selected node, to add the selected node to the RAN or to remove the selected node from the RAN to change a topology of the RAN for serving a plurality of UEs in accordance with the change in traffic load in the part of the RAN; and transmitting, to a traffic engineering controller, a notification of a change in the topology of the RAN caused by the instruction to add or remove the selected node from the RAN.

* * * * *